Sept. 13, 1960 H. FLIEGNER 2,952,457
SYSTEM FOR SEPARATING AND CONVEYING FLAT ARTICLES
Filed Feb. 28, 1957
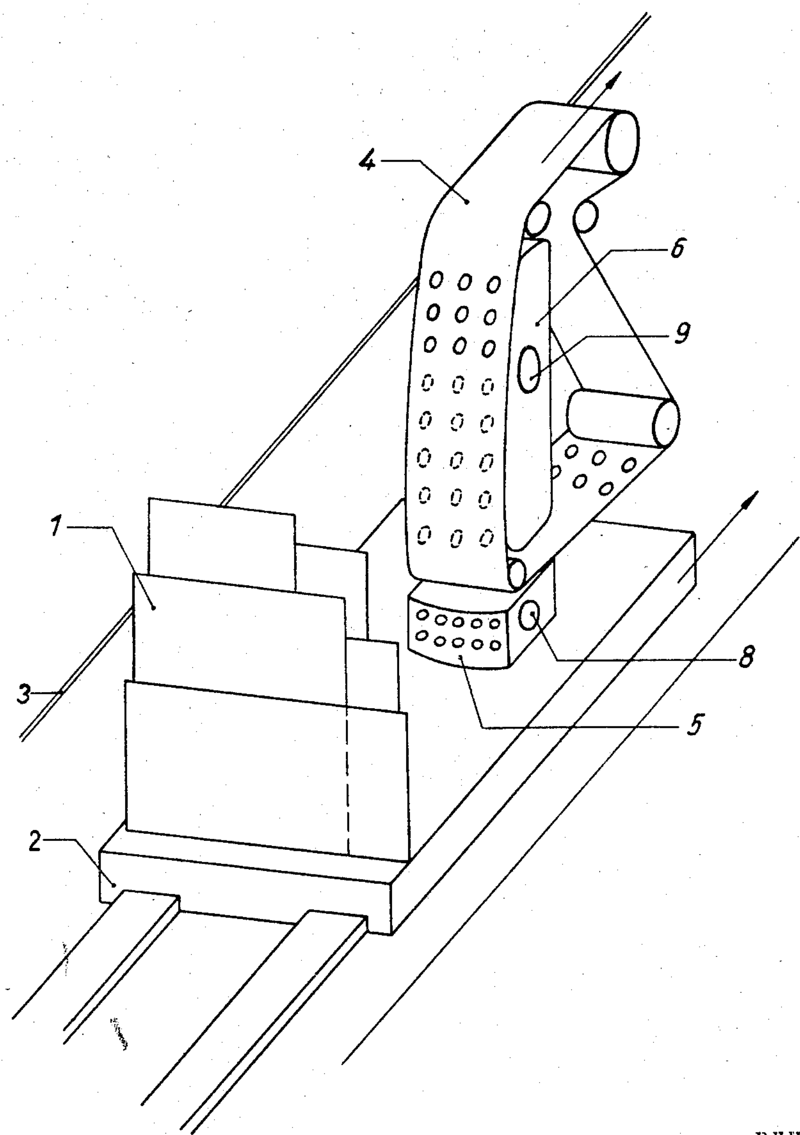
INVENTOR
H. FLIEGNER
BY
ATTORNEY United States Patent Office 2,952,457 Patented Sept. 13, 1960

1

2,952,457

SYSTEM FOR SEPARATING AND CONVEYING FLAT ARTICLES

Horst Fliegner, Berlin-Lankwitz, Germany, assignor to International Standard Electric Corporation, New York, N.Y., a corporation of Delaware Filed Feb. 28, 1957, Ser. No. 643,097

Claims priority, application Germany Mar. 8, 1956

5 Claims. (Cl. 271—12)

This invention relates to systems for separating and conveying flat articles of paper, cardboard or the like which have been assembled in a stack or pile. It is particularly applicable to the conveyance and processing of letters and other pieces of mail.

In a system of the kind in which the articles are separated and picked up by a perforated conveyor belt which passes over a suction head, it has been found that due to the nature of their surface or on account of electrostatic surface attraction, the articles tend to adhere to one another with the result that two or more may be picked up together.

It is an object of the present invention to provide an arrangement which overcomes this disadvantage.

According to one feature of my invention, in a system of the type above referred to, the suction head over which the perforated belt passes, is curved so as to bend the article which is sucked against the section of the belt passing over it. In this manner the distance between the adjacent surfaces of the two foremost articles of the stack will be increased over the greater part of their area, whereby the articles will not adhere, even if the pressure with which the stack is advanced towards the belt is relatively high.

According to a further feature of the invention a second suction head is provided in substantial alignment with the first and in advance of the latter with respect to the direction of travel of the belt, but not traversed by the belt.

These and other features will be apparent from the following description of one embodiment of my invention taken in conjunction with the accompanying drawing which is a perspective view of a letter or card separating and conveying system.

A stack 1 of letters or cards is supported vertically or edgewise on a slide 2 which is arranged to advance the stack with slight pressure, for example, by means of a spring (not shown), against a belt 4. Although the articles to be separated are vertically positioned they will be referred to as a "stack."

The belt 4, which is driven in any known manner in the direction of the arrow, is provided with groups of apertures or perforations suitably spaced apart to predetermine the spacing of the letters or other articles to be processed. The spacing may, if required, be so dimensioned that the articles will overlap one another on the belt.

A suction head 6, connected to a suction source via the duct 9, is mounted behind a section of the throw of the belt 4, its surface adjacent the belt being provided with a group of suction holes (indicated in broken line circles). The surface of the head 6 may be of such length in the direction of travel of the belt, and the suction holes in said head may extend over such length, that an article which has been sucked against the belt 4 will be held there for any predetermined distance of travel of the belt, whereby it may be conveyed, for example, to a stamping machine, if desired by a supplementary conveyor belt.

The surface of the suction head 6 adjacent the belt 4 is curved in the direction of travel of the belt and is located in a substantially vertical plane, whereby the gravity of the articles in the stack 1 will aid in their separation. Alternatively, however, such surface may be curved in a direction normal to the direction of travel of the belt or it may be curved in both the vertical and horizontal directions.

A second suction head 5, connected to a suction source via a duct 8, may be fixedly mounted adjacent the head 6 and in front of the latter with respect to the direction of travel of the belt 4, which passes through the space between the two heads. The surface of the head 5 opposite the article pile 1 is curved preferably in a direction normal to the curvature of the surface of the head 6, and is also provided with suction holes. The suction applied by the head 5 is preferably weaker than that applied by the head 6.

In operation, the foremost article of the stack 1 is first sucked against the surface of the head 5. When a group of perforations of the belt 4 commences to pass over the suction holes in the surface of the head 6, the article will be sucked against the belt 4, and as the belt advances, due to the stronger suction applied by the head 6 the article will be drawn away from the head 5 and will travel with the belt until the perforated area of the surface of the head 6 is passed. As already explained, due to the curvature of the surfaces of the heads 5 and 6, the margins of the article are first drawn away from the surface of the next article, thus separating them.

As soon as the first article is drawn away from the head 5, the next or second article is sucked against it and remains in this position until the next group of perforations in the belt 4 commences to pass over the holes in the curved surface of the head 6. The groups of perforations in the belt may be so spaced that the second article overlaps the first or is spaced therefrom by any desired amount. It has been observed that when the second article is sucked against the head 5 the rush of air into the space between the adjacent surfaces of the second and third articles overcomes the adhesion between them and assists in their separation.

While I have described above the principles of my invention in connection with specific apparatus, it is to be clearly understood that this description is made only by way of example and not as a limitation to the scope of my invention.

What is claimed is:

1. A system for separating and conveying flat articles of paper, cardboard or the like from a stack of such articles comprising means for moving said stack in a first direction, a first fixed suction head disposed in the path of said stack, said first head having a face curved in the direction of movement of said stack, a conveyor belt provided with groups of apertures spaced along its length and means for driving said belt over the face of said first head in a second direction, said second direction substantially normal to said first direction, said belt having a run over another portion of said first head in said first direction away from said head, a second fixed suction head in the path of said stack, said second head having a face curved in the direction of movement of said stack and normal to the direction of curvature of the first head, whereby each article is separated from said stack and separately conveyed by said belt and ultimately delivered thereby in a plane normal to the plane of the articles in said stack.

2. A system as claimed in claim 1, wherein the articles of said stack stand on edge and the part of said belt passing over the face of said first head is disposed in a substantially vertical plane.

3. A system as claimed in claim 2, wherein said second suction head is located below said first suction head and in substantially vertical alignment therewith.

4. A system as claimed in claim 3, in which the suction applied by said second suction head is weaker than that applied by said first suction head.

5. A system as claimed in claim 1, wherein said groups of apertures in said belt are so spaced relative to the size of said articles that one article picked up by the belt is overlapped by the succeeding article which is picked up.

References Cited in the file of this patent

UNITED STATES PATENTS

| | | |
|---|---|---|
| 1,724,077 | Fleischer et al. | Aug. 13, 1927 |
| 2,303,385 | Peters | Dec. 1, 1942 |
| 2,621,928 | Lauffer | Dec. 16, 1952 |
| 2,693,957 | Welsh | Nov. 9, 1954 |
| 2,749,117 | Chew | June 5, 1956 |
| 2,752,154 | Nelson | June 26, 1956 |
| 2,822,170 | Frantz | Feb. 4, 1958 |
| 2,837,333 | Sindzinski et al. | June 3, 1958 |